UNITED STATES PATENT OFFICE.

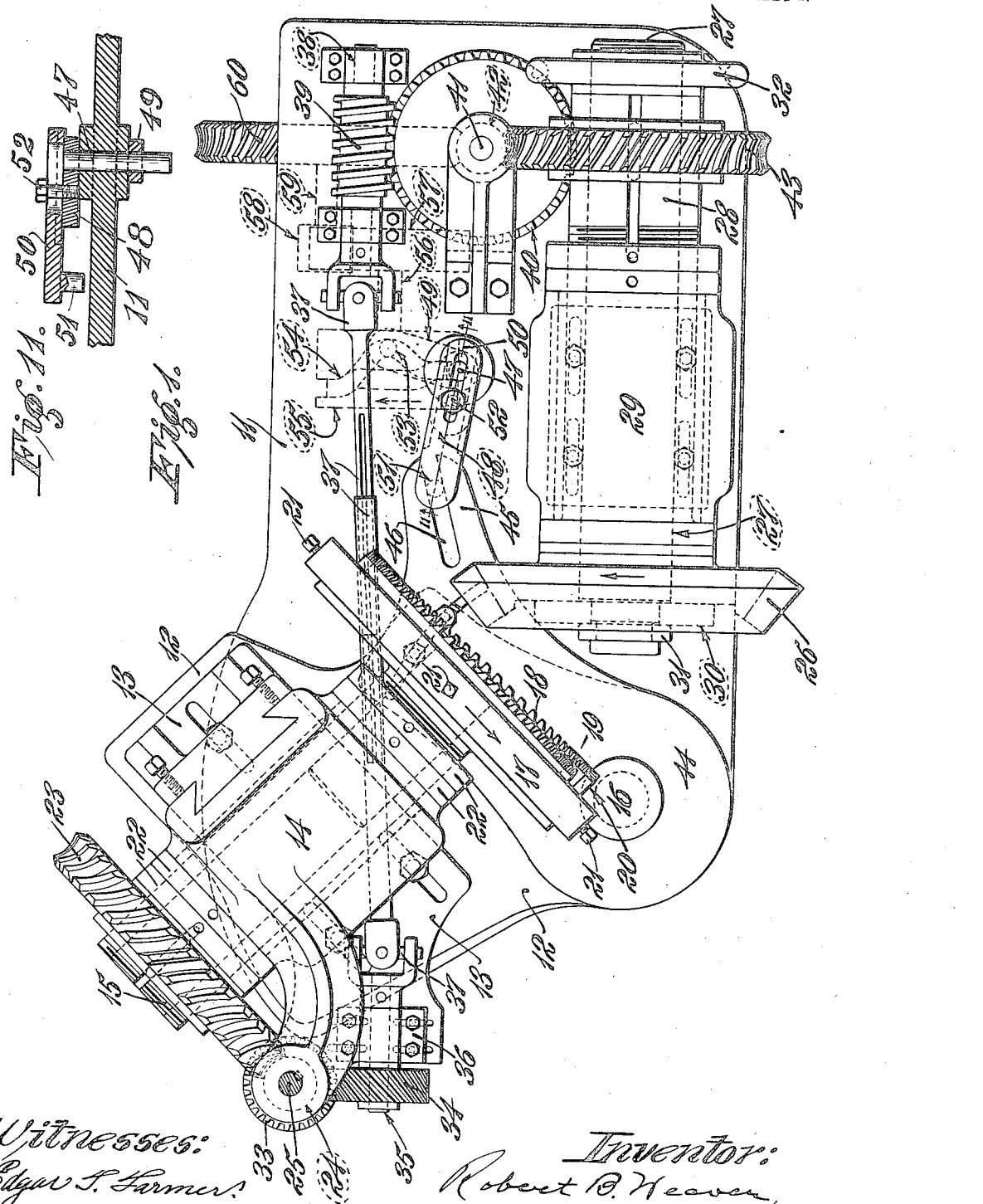

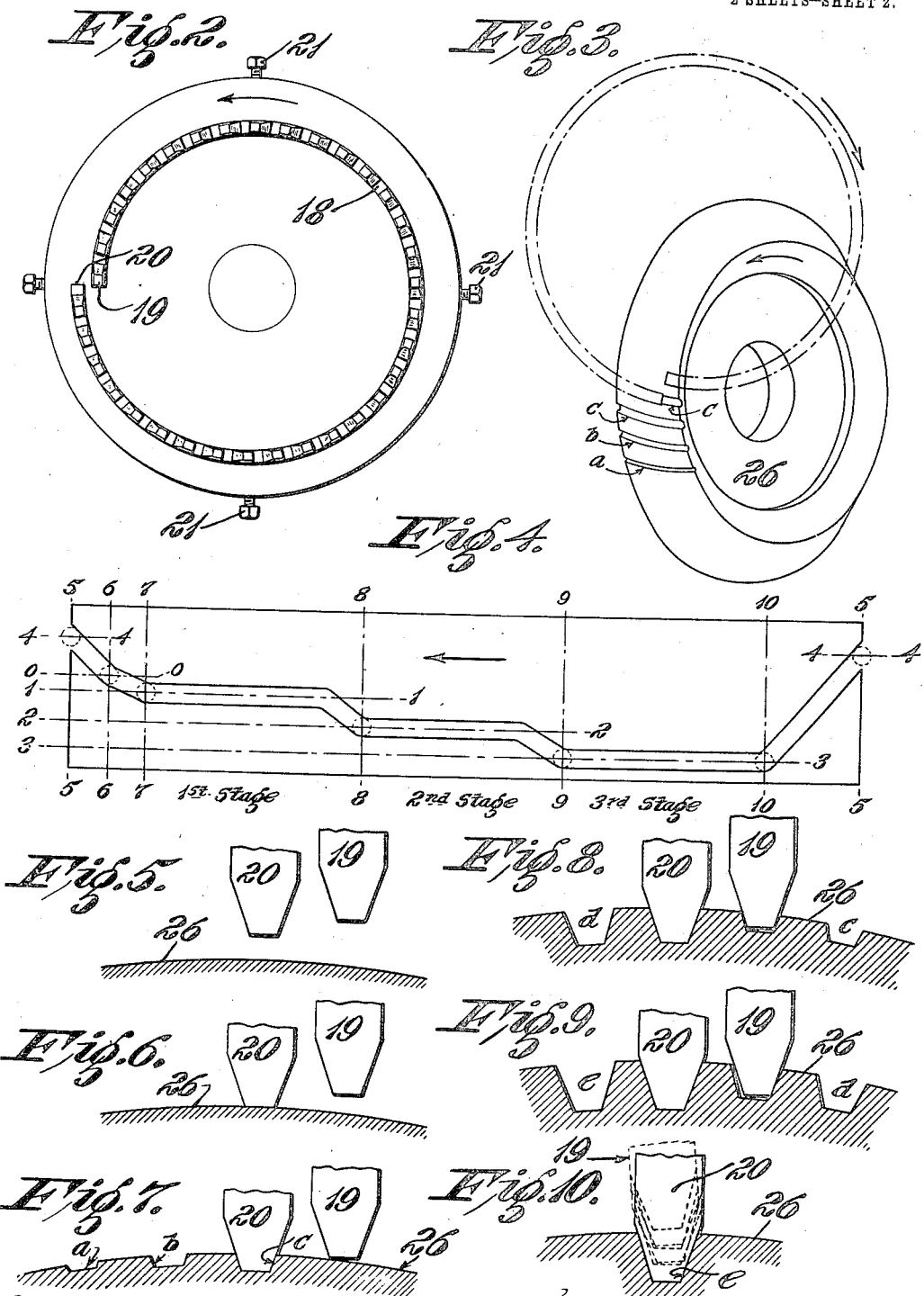

ROBERT B. WEAVER, OF DETROIT, MICHIGAN, ASSIGNOR TO THE TIMKEN-DETROIT AXLE COMPANY, OF DETROIT, MICHIGAN, A CORPORATION OF OHIO.

MACHINE FOR CUTTING SPIRAL TEETH ON CONICAL GEAR-BLANKS.

1,133,516.

Specification of Letters Patent.

Patented Mar. 30, 1915.

Application filed April 13, 1914. Serial No. 831,412.

*To all whom it may concern:*

Be it known that I, ROBERT B. WEAVER, a citizen of the United States, and a resident of the city of Detroit, in the county of Wayne and State of Michigan, have invented a new and useful Improvement in Machines for Cutting Spiral Teeth on Conical Gear-Blanks, of which the following is a specification.

This invention relates to cutting spiral bevel gears, worm bevel gears, helical bevel gears, spiral and helical crown gears, and the like.

The object of the invention is to produce partly finished gears or gear blanks suitable for finishing in other machines.

The invention consists in a machine for rapidly cutting teeth for said gears to approximately correct shape, whereby said teeth can be readily finished to correct shape in a more delicate machine.

The invention further consists in the parts and arrangements hereinafter described, and is defined with more particularity in the claims appended hereto.

In the drawings accompanying this specification, Figure 1 is a plan view of a machine embodying my invention; Fig. 2 is a face view of the spiral cutter; Fig. 3 is a diagram showing the relative positions of the spiral cutter and gear blank during the operation of cutting the teeth; Fig. 4 is a development of the cam for controlling the angular movement of the cutter spindle toward and away from the gear blank; and Figs. 5 to 9, inclusive, are diagrams showing the relative positions of the two ends of the cutter and the cross-section shape of the tooth spaces at successive stages of the operation; Fig. 10 is a diagram showing a tooth space and the relative positions of the first and last teeth of the cutter blade with respect to the tooth space at the beginning or end of each stage of the operation; and Fig. 11 is a cross-section on the line 11—11 in Fig. 1 showing the bell crank partly in side elevation.

Referring to Fig. 1, the machine shown therein comprises a bed plate 11 supported on legs so as to be clear of the floor. Supported on the bed plate near one end thereof is an angularly movable frame plate 12 for supporting the cross slide 13 which carries the vertically adjustable pedestal bearing 14 for the horizontal cutter head spindle 15. The frame plate 12 is pivoted to the bed plate by a vertical pin 16, and can swing through a small arc in a horizontal plane about the pin as a center. The cutter head 17 is a round disk and is removably secured to the front end of the spindle 15 in any suitable manner. The cutter head carries the spiral cutter 18 upon its front face, the ends of the cutter teeth being at increasing distances from said face around the spiral. The axis of the cutter head spindle passes behind the pin 16, and the front face of the cutter head is very nearly in line with the axis of the pin. A plane through the cutting points of the longest teeth and at right angles to the axis of the cutter head goes through the axis of the pin. Hence the path of the longest teeth of the cutter lies in a plane through the axis of the pin whatever the angular position of the frame plate 12.

The spiral cutter 18 may be made in the form of a continuous toothed blade, secured to the cutter head in a spiral and with their points at progressively increasing distances therefrom. The cutter blade 18 is of approximately the same shape in cross-section as the normal outline of the tooth space to be cut, that is, the outline of the tooth space at right angles to the sides of the teeth. The points of the teeth at the inner end 19 of the blade are closest to the face of the cutter head, and the points of the teeth at the outer end 20 are farthest therefrom; but this arrangement may be reversed provided that the cutter head and gear blank are rotated in the opposite directions from the directions of rotation as shown in Figs. 1, 2 and 3.

In the arrangement shown in Figs. 1, 2 and 3, the outer end 20 of the spiral blade, which cuts the deepest part of the tooth space, is adjusted with its axis of symmetry normal to the gear blank at the cutting point. The teeth at the outer end of the spiral are approximately one-third longer than the teeth at the inner end of the spiral to conform to the number of stages or successive cuts required for the completion of the cutting operation. If the cutting operation is to be performed in two stages, the long teeth would have to be fifty per cent. longer than the short teeth. The inner end of the spiral blank may be made the longest and the direction of rotation of cutter and blank reversed, if desired. The difference in the radial distances of the inner and outer ends of the spiral blade from the axis of the cutter head is approximately the same as the circular pitch of the gear which the blade is designed to cut. The spiral blade may be secured to the cutter head in any suitable manner, as by being set into a spiral groove in the front face of the cutter head and held in place by set screws 21.

The plane of the face of the cutter head with respect to the axis of the pin 16 may be adjusted by means of the ring nuts 22, threaded on the cutter head spindle 15 and bearing against each end of the pedestal bearing 14. A worm wheel 23 is adjustably secured to the rear end of the cutter head spindle for rotating the cutter head. A worm 24 splined on a vertical shaft 25 meshes with and drives the worm wheel 23. The vertical shaft 25 is driven by means of a flexible shaft from a suitable countershaft placed on the ceiling above the machine.

The gear blank 26 to be operated upon is mounted upon the end of a horizontal spindle or arbor 27 slidably arranged in a sleeve 28 rotatably mounted in a pedestal bearing 29 which is bolted to the bed plate. The axis of the spindle or arbor 27 intersects the axis of the pin 16 at right angles thereto, and the pedestal bearing 29 is adjustable on the bed plate toward and from the pin. The gear blank is clamped to the arbor 27 and sleeve 28 by means of a disk 30 which is removably secured on the end of the arbor outside of the gear blank by means of a spanner ring 31 seated in a circumferential groove around the end of the arbor. The opposite end of the arbor is screw-threaded and projects through the sleeve 28, and a hand wheel 32 with an internally threaded hub is mounted on the projecting end of the arbor and bears against the end of the sleeve. By turning the hand wheel the arbor can be drawn through the sleeve to clamp the gear blank.

The gear blank arbor is rotated by a train of gearing at a speed which bears the following ratio to the speed of rotation of the cutter head, namely, one divided by the number of teeth to be cut in the gear blank. The train of gearing for rotating the gear blank arbor includes a pair of spiral gears 33, 34, mounted one on the lower end of the vertical shaft 25 which is driven from the ceiling, and the other on a short horizontal shaft 35 mounted in a bearing block 36 bolted on the cross slide 13. The bearing 36 and shaft 35 are adjustable toward and from the vertical shaft 25, whereby different sets of spiral gears 33, 34 may be used, depending upon the speed ratio of gear blank to cutter head which it is desired to use.

The short shaft 35 on the cross slide 13 is connected by means of universal joints and telescoping shaft sections 37 with a second short shaft 38 which is mounted in bearings secured to the bed plate 11 at the opposite end of the machine from the shaft 35. The short shaft 38 carries a worm 39 which drives a worm wheel 40 on a vertical shaft 41 which passes through the bed plate and is mounted in bearings fixed thereto. The upper end of the vertical shaft 41 carries a worm 42 which drives a worm wheel 43 splined on the sleeve 28 which carries the gear blank arbor 27. The train of gearing between the cutter head spindle and gear blank arbor is such that the cutter head and gear blank are simultaneously rotated in the direction shown by the arrows in Figs. 1 and 3. In order to bring the cutting faces of the teeth of the cutter blade into cutting relation with the gear blank, the frame plate 12 has a sector portion 44 which is angularly adjustable about the pin 16 with respect to the frame plate. The adjustable sector portion 44 is provided with a projecting lug 45 on its edge toward the gearing train which drives the gear blank arbor. This lug 45 has a slot 46, the sides of which are vertical and parallel, forming a slide for an operating pin, whereby the sector and frame plate can be oscillated about the pivot pin 16. A bell crank lever having both its arms horizontally disposed is pivotally mounted on the bed plate opposite the end of the slot 46, the pivot 47 of the lever being in line with the slot at about the middle of the arc of movement of the adjustable frame sector 44. The pivot 47 passes through the bed plate, and one arm 48 of the bell crank lever is above the bed plate and extends toward the slot 46, and the other arm 49 is below the bed plate and at approximately right angles to the arm 48. The arm 48 carries a slotted extension 50 with a pin 51 on its end which works in the slot 46 in the frame sector 44. A bolt 52 passing through the slot in the arm extension 50 secures the latter to the arm 48, and enables the extension to be moved lengthwise of the arm for adjusting the radial distance of the pin 51 from the pivot of the bell crank lever.

The lower arm 49 of the bell crank lever carries at its extremity a pin 53 which engages in a circumferential cam slot 54 on a cylindrical cam 55. The cam 55 is mounted on a shaft 56 journaled below the bed plate, and is rotated by means of a train of gearing from the vertical shaft 41 which forms part of the train of gearing which drives the gear blank arbor. This gearing comprises a spur gear 57 mounted on the shaft 56 and meshing with a spur pinion 58 on a horizontal shaft 59 journaled below the bed plate and carrying a worm wheel 60. The vertical shaft 41 extends down through the bed plate and carries a worm at its lower end, similar to the worm 42. The worm at the lower end of the vertical shaft 41 meshes with and drives the worm wheel 60. The train of gearing for driving the cam 55 is such that the cam is rotated at a speed slightly less than one-third the speed of rotation of the gear blank arbor, and the portion of the cam engaged by the pin 53 is caused to move in the direction of the arrow in Fig. 1.

The cam slot 54 consists of a series of three straight circumferential portions within which the pin 53 slides without moving. These straight portions are axially and circumferentially displaced with respect to each other around the cam and are connected by helical portions leading in the same direction, so that the greater part of the cam slot winds around the cam in a broken curve having the general direction of a helix. The straight portions at the two ends of the helix-like portion of the cam slot are connected by a reverse helical portion which extends axially a greater distance than the axial displacement of the initial straight portion with respect to the terminal straight portion and then reverses its direction to connect with the end of the initial straight portion. A complete revolution of the cam in the direction of the arrow from its position in Fig. 1 will move the pin 53 to the left sufficiently to cause the cutter blade to engage the gear blank and cut the full depth of the tooth space, and then will move the pin to the right and cause the cutter blade to withdraw from the cut. The depth of the cut may be varied by adjusting the length of the extension portion 50 of the top lever arm 48.

The cam 55 and coöperating parts of the machine are so constructed and arranged as to feed the cutter blade from out of cutting engagement to an angular position where it will cut one-third of the depth of the tooth space and retain it in this angular position until the gear blank has made nearly one complete revolution and each tooth space is roughed out to one-third its depth. During the second revolution of the gear blank the cutter head is held in angular position to cut two-thirds the depth of the tooth space; and during the third revolution of the gear blank the cutter head is held in angular position to cut the full depth of the tooth space.

A development of the cam 55 is shown in Fig. 4, the direction of rotation being shown by the arrow. The position of the cam pin with respect to the cam corresponding to each of the serial stages of the cutting operation shown in Figs. 5 to 9 is indicated by dotted circles in Fig. 4.

Fig. 5 shows the relative positions of the inner end 19 and outer end 20 of the cutter blade with respect to the gear blank 26 at the beginning of the operation. The cam is at the end of the slot as shown in Fig. 4. After about three revolutions of the cutter head the cam will have turned through the angle between the lines 5—5 and 6—6, and the pin will have been displaced laterally from the line 4—4 to the line 0—0, corresponding to the initial cutting point, as shown in Fig. 6. During the next revolution of the cutter head, which is the first cutting revolution, only a portion of the spiral cutter blade comprising about a third of the whole number of teeth will engage the gear blank. About three revolutions of the cutter head are required to rotate the cam through the angle between the lines 6—6 and 7—7. The shape of the tooth space at the end of the first cutting revolution of the cutter head will resemble the tooth space "a" in Fig. 7. During the second cutting revolution of the cutter head about two-thirds of the teeth of the cutter blade will engage the gear blank, and the second tooth space will be about as shown at "b" in Fig. 7. At the end of the second cutting revolution of the cutter head the cam will have moved the cam pin laterally from the line 0—0 to the line 1—1, and all the teeth of the cutter blade will engage the gear blank during the third cutting revolution of the cutter head. The third and succeeding tooth spaces cut during the first revolution of the gear blank will have the shape shown at "c" in Figs. 7 and 8.

Toward the end of the first revolution of the gear blank the relative position of the cam with respect to the pin will approach the line 8—8, and the inclined portion of the slot will engage the pin. At the end of the first revolution of the gear blank the pin will have been moved laterally from the line 1—1 to the line 2—2, and the cutter head will be fed toward the gear blank for the second cut or stage of the operation, as shown in Fig. 8. The tooth spaces as left by the cutter blade after its second cut will have the shape shown at "d" in Figs. 8 and 9. Similarly, toward the end of the second cutting stage of the operation, the relative position of the cam with respect to the pin will approach the line 9—9, and at the end of the second revolution of the gear blank after the start of the cutting operation, the pin will have been moved laterally from the line 2—2 to the line 3—3 in Fig. 4. At this stage the cutter head will have been fed toward the blank in readiness for the third cut, as shown in Fig. 9. The tooth spaces as left by the cutter blade after the third cut, which is the final one, will have the shape shown at "e" in Figs. 9 and 10. Following the completion of the third stage of the cutting operation the cam pin will be engaged by the inclined portion of the cam between the lines 10—10 and 5—5, and will be moved laterally back from the line 3—3 to the line 4—4 at the starting point, at which point the cutter blade is completely withdrawn from engagement with the finished gear blank, and the latter may be removed from the arbor.

It is evident from the preceding description that the same cutter blade can be used to rough out gears having various angles of bevel and numbers of teeth by properly adjusting the position of the cutter head spindle and gear blank arbor and using suitable ratios for the gearing trains, provided the circular pitch is the same for all the gears to be cut. In adjusting the gear blank arbor, the apex of the conical pitch surface of the gear blank should be brought to coincide with the axis of the pin 16, which can be done by shifting the pedestal bearing 29 along the bed plate toward or from the pin. The worm wheel 43 can be slid along the splined sleeve and secured by a set screw in proper position to mesh with the worm 42. The cutter head spindle should be adjusted axially in its bearing to bring the points of the longest teeth of the cutting blade into a plane passing through the axis of the pin 16 at right angles to the axis of the spindle. The angular adjustability of the sector 44 on the frame plate 12 permits angular adjustment of the plane of the cutter head to suit the angle of bevel of the gear blank. The position of the cutting point of the cutter blade with respect to the rim of the gear blank can be adjusted to suit the angularity of the helical teeth to be cut, by shifting the cross slide 13 and pedestal 14, which will not affect the position of the plane of the cutting points of the cutter blade teeth. The depth of the cut can be varied to suit the desired tooth shape by adjusting the length of the extension portion 50 of the lever arm 48 to give more or less throw to the pin 51 which oscillates the frame 12. For cutting small gears or gears of soft metal it will not be necessary to make the cut in three stages and it is obvious that a cam having a slot with only two, or even only one, straight portions, can be substituted for the cam 55, in which case the train of gearing which drives the cam will have to be modified also in order to rotate the cam at slightly less than one-half the speed of the gear blank arbor, or at a speed nearly equal to that of the arbor.

Other modifications of the parts and arrangements shown and described for special purposes will occur to those skilled in the art, and the invention is not restricted to the precise forms and arangements of parts shown. Although the claims specify the invention as applied to spiral gear teeth, it is not restricted to shaping spiral gear teeth. The invention is applicable to shaping helical and conical gear wheels and similar toothed articles having curved teeth. The invention is also applicable to roughing out gear wheels prior to finishing them with short straight teeth.

I claim the following as my invention:

1. A machine for cutting spiral bevel gears comprising a rotatably mounted arbor for a gear blank, a rotatably mounted spindle with its axis arranged at an angle to the axis of said arbor and in a plane parallel thereto, a cutter head on said spindle, said cutter head having cutting teeth arranged in the form of a spiral on its face, and means for rotating said spindle and arbor at a fixed velocity ratio.

2. A machine for cutting spiral bevel gears comprising a rotatably mounted arbor for a gear blank, a rotatably mounted spindle with its axis arranged at an angle to the axis of said arbor and in a plane parallel thereto, cutter head on said spindle, said cutter head having cutting teeth arranged in the form of a spiral on its face, means for causing relative movement of approach between said arbor and spindle, and means for rotating said spindle and arbor at a fixed velocity ratio.

3. A machine for cutting spiral bevel gears comprising a rotatably mounted arbor for a gear blank, a rotatably mounted spindle with its axis arranged at an angle to the axis of said arbor, a cutter head on said spindle, said cutter head having cutting teeth arranged in the form of a spiral on its face, means for swinging said spindle with respect to said arbor for causing relative movement of approach between said cutting teeth and said arbor, and means for rotating said spindle and arbor at a fixed velocity ratio.

4. A machine for cutting spiral bevel gears, comprising a bed plate, a rotatably mounted arbor for a gear blank supported on said bed plate, a swinging frame pivoted to said bed plate, the axis of the pivot intersecting the axis of said arbor at right angles, a rotatably mounted spindle carried by said frame with its axis arranged at an angle to the axis of said arbor, a cutter head on said spindle, said cutter head having cutting teeth arranged in the form of a spiral on its face, means for swinging said frame to cause said teeth to approach said arbor, and means for rotating said spindle and arbor at a fixed velocity ratio.

5. A machine for cutting spiral bevel gears comprising a bed plate, a rotatably mounted arbor for a gear blank adjustably supported on said bed plate, a swinging frame pivoted to said bed plate, the axis of the pivot intersecting the axis of said arbor at right angles, a rotatably mounted spindle adjustable in said frame with its axis arranged at an angle to the axis of said arbor, a cutter head on said spindle, said cutter head having cutting teeth arranged in the form of a spiral on its face, means for swinging said frame to cause said teeth to approach said arbor, and means for rotating said spindle and arbor at a fixed velocity ratio.

6. A machine for cutting spiral bevel gears comprising a bed plate, a rotatably mounted arbor for a gear blank adjustably supported on said bed plate, a two-part swinging frame pivoted to said bed plate, one of said parts being angularly adjustable with respect to the other, and the pivotal axis of both parts intersecting the axis of said arbor at right angles, a rotatably mounted spindle adjustable in said frame with its axis arranged at an angle to the axis of said arbor, a cutter head on said spindle, said cutter head having cutting teeth arranged in the form of a spiral on its face, means for swinging said frame to cause said teeth to approach said arbor, and means for rotating said spindle and arbor at a fixed velocity ratio.

7. In a machine for cutting spiral bevel gears, a swinging frame, a spindle rotatably mounted thereon, gearing for rotating said spindle, an arm having a connection with said frame for holding and swinging it, said arm being provided with a cam follower, a rotatable cam having a groove for said follower, gearing for rotating said cam, and a flexible shaft connecting said spindle gearing and said cam gearing.

8. In a machine for cutting spiral bevel gears, a swinging frame, a spindle rotatably mounted thereon, gearing for rotating said spindle, an arm having a connection with said frame for holding and swinging it, said arm being provided with a cam follower, a rotatable cam having a groove for said follower, said groove having a dwell portion for holding said follower stationary during part of each revolution of the cam, gearing for rotating said cam, and means for rotating said spindle gearing and said cam gearing at a fixed velocity ratio.

9. In a machine for cutting spiral bevel gears, a swinging frame, a spindle rotatably mounted thereon, gearing for rotating said spindle, an arm having a connection with said frame for holding and swinging it, said arm being provided with a cam follower, a rotatable cam having a groove for said follower, said groove comprising a series of dwell portions displaced sidewise with respect to the path of movement of said follower, connected by portions inclined to the path of movement of said follower, gearing for rotating said cam and means for rotating said spindle gearing and said cam gearing at a fixed velocity ratio, whereby said frame is intermittently oscillated and held at rest for definite periods of rotation of said spindle.

10. In a machine for cutting spiral bevel gears, a journal bearing, a spindle rotatably mounted thereon, a cutter head carried by said spindle, said cutter head having cutters arranged in a flat spiral curve with their cutting points at increasing distances from the plane of said spiral, an arbor for a gear blank, and means for rotating said arbor one tooth space of the gear being cut for each rotation of the cutter head spindle.

11. In a machine for cutting spiral bevel gears, a swinging frame, a spindle rotatably mounted thereon, a cutter head carried by said spindle, said cutter head having cutters arranged in a flat spiral curve with their cutting points at increasing distances from the plane of said spiral, an arbor for a gear blank, means for swinging said frame to move said cutter head toward and away from said arbor, and means for rotating said arbor one tooth space of the gear being cut for each rotation of the cutter head spindle.

12. In a machine for cutting spiral bevel gears, a swinging frame, a spindle rotatably mounted thereon, a cutter head carried by said spindle, said cutter head having cutters arranged in a flat spiral curve with their cutting points at increasing distances from the plane of said spiral, an arbor for a gear blank, means for intermittently swinging said frame to move said cutter head toward and away from said arbor, and means for rotating said arbor one tooth space of the gear being cut for each rotation of the cutter head spindle.

13. In a machine for cutting spiral bevel gears, a rotatably mounted cutter head, cutting teeth arranged in a flat spiral on said cutter head, the ends of said spiral being in proximity to each other and at respective distances from the axis of said cutter head such that the difference between said distances is approximately equal to the circular pitch of the gear to be cut thereby, means for continuously rotating a gear blank in front of said cutter head, and means for causing relative movement of said cutter head and gear blank whereby said cutting teeth are fed into said gear blank.

14. In a machine for cutting spiral bevel gears, a swinging frame, a cam having a continuous groove, a follower engaging in said groove, and positively acting connections between said follower and said swinging frame for imparting movement thereto, said connections comprising a sector adjustably secured to said swinging frame and a crank arm connected at its end to said sector, said crank arm being adjustable in length.

15. In a machine for cutting spiral bevel gears, a bed plate, a rotatably mounted arbor for a gear blank carried thereby, a swinging frame pivoted to said bed plate, a rotatably mounted cutter spindle carried by said frame, the axis of said spindle being at an angle to the axis of said arbor, means for swinging said frame comprising a cam mounted for rotation on said bed plate, a movable follower supported on said bed plate and adapted to coöperate with said cam, connections between said follower and frame whereby movement of said follower produces like movement of said frame, and gearing between said arbor, said spindle and said cam for rotating them at fixed velocity ratios with respect to one another.

16. In a machine for cutting spiral bevel gears, a bed plate, a rotatably mounted arbor for a gear blank carried thereby, a swinging frame pivoted to said bed plate, a rotatably mounted cutter spindle carried by said frame, the axis of said spindle being at an angle to the axis of said arbor, means for swinging said frame comprising a cam mounted for rotation on said bed plate, a movable follower supported on said bed plate and adapted to coöperate with said cam, adjustable connections between said follower and frame whereby movement of said follower produces like movement of said frame, and change gearing between said arbor, said spindle and said cam for rotating them at predetermined fixed velocity ratios with respect to one another.

17. A machine for cutting spiral bevel gears comprising a cutter head mounted for rotation in a plane perpendicular to its axis of rotation and having a series of cutting teeth conforming to the normal shape of tooth space to be cut, said cutting teeth being arranged in a spiral curve and at varying distances from said plane of rotation of the cutter head.

18. A machine for cutting spiral bevel gears comprising a cutter head mounted for rotation in a plane perpendicular to its axis of rotation and having a series of cutting teeth conforming to the normal shape of tooth space to be cut, said cutting teeth being arranged in a spiral curve and at varying distances from said plane of rotation of the cutter head, and means for rotating a gear blank with its periphery normal to said spiral.

19. A machine for cutting spiral bevel gears comprising a cutter head mounted for rotation in a plane perpendicular to its axis of rotation and having a series of cutting teeth conforming to the normal shape of tooth space to be cut, said cutting teeth being arranged in a spiral curve and at varying distances from said plane of rotation of the cutter head, increasing toward one end of said spiral, and means for rotating a gear blank with its periphery normal to said spiral at a point near the end where the long cutting teeth are located.

20. A machine for cutting spiral bevel gears comprising a cutter head mounted for rotation in a plane perpendicular to its axis of rotation and having a series of cutting teeth conforming to the normal shape of tooth space to be cut, said cutting teeth being arranged in a spiral curve and at varying distances from said plane of rotation of the cutter head, means for rotating a gear blank with its periphery opposite the path of said cutting teeth, and means for swinging the plane of rotation of said cutter head toward said gear blank.

21. A machine for cutting spiral bevel gears comprising a bed plate, an arbor for a gear blank supported on said bed plate for rotation on an axis parallel thereto, a frame pivotally supported on said bed plate, said frame comprising two parts which are relatively adjustable about its pivotal axis one with respect to the other, a rotatably mounted spindle adjustably supported by said frame with its axis arranged at an angle to the axis of said arbor, a cutter head on said spindle, said cutter head having cutting teeth arranged in the form of a spiral on its face, means for swinging said frame to cause said teeth to approach said arbor, and means for rotating said spindle and arbor at a fixed velocity ratio.

22. A machine for cutting spiral bevel gears comprising a pivoted frame adapted for oscillatory movement, a spindle rotatably mounted on said frame, means for rotating said spindle, a lever arm provided with a cam follower, an adjustable connection between said pivoted frame and lever arm, a rotatable cam adapted to be engaged by said cam follower, said cam having portions adapted to move said cam follower and intervening portions adapted to hold it stationary, and means for rotating said cam in synchronism with said spindle, whereby said frame is alternately moved and held at rest for successive periods of rotation of said spindle.

Signed at Detroit, Michigan, this 7th day of April, 1914.

ROBERT B. WEAVER.

Witnesses:
LESLIE WILLIAMS,
W. C. WOOD.